UNITED STATES PATENT OFFICE.

WILLIAM H. BEARDSLEY, OF PITTSBURG, PENNSYLVANIA.

PLASTER.

SPECIFICATION forming part of Letters Patent No. 639,340, dated December 19, 1899.

Application filed February 21, 1899. Serial No. 706,339. (No specimens.)

*To all whom it may concern:*

Be it known that I, WILLIAM H. BEARDSLEY, a citizen of the United States of America, residing at Pittsburg, in the county of Allegheny and State of Pennsylvania, have invented certain new and useful Improvements in Plaster; and I do hereby declare the following to be a full, clear, and exact description thereof.

My composition consists of the following ingredients combined in or about the proportions stated, viz: sand, thirteen hundred pounds; cinders, two hundred pounds; cement, three pounds; glue, eight pounds; hair, one and one-half pounds; muriatic acid, one pound; molasses, one pound; talc, three pounds; stucco—*i. e.*, slaked lime, white sand, and gypsum—four hundred pounds; whiting, one hundred pounds, and lime one hundred pounds. These ingredients are to be thoroughly mingled with the proper proportion of water to form a plastic mass either by a pug-mill or in the manner well known in the art. By the use of this mixture a fine-grained and easily-working material is formed for use as a plaster for buildings, masonry, brickwork, &c.

What I claim, and desire to secure by Letters Patent of the United States, is—

The herein-described composition of matter, consisting of water, sand, cinders, cement, glue, stucco, lime, hair, whiting, molasses, talc and acid, substantially as described and for the purpose specified.

In testimony whereof I have hereunto affixed my signature in the presence of two subscribing witnesses.

WILLIAM H. BEARDSLEY.

Witnesses:
JOHN GROETZINGER,
H. E. BECKER.